E. HINE & G. W. BENTLEY.
Soldering-Machines.

No. 156,223. Patented Oct. 27, 1874.

WITNESSES.

INVENTOR.

UNITED STATES PATENT OFFICE.

EDWARD HINE, OF NEW YORK, N. Y., AND GEORGE W. BENTLEY, OF BROOKLYN, NEW YORK.

IMPROVEMENT IN SOLDERING-MACHINES.

Specification forming part of Letters Patent No. 156,223, dated October 27, 1874; application filed September 9, 1874.

*To all whom it may concern:*

Be it known that we, EDWARD HINE, of the city, county, and State of New York, and GEORGE W. BENTLEY, of Brooklyn, Kings county, New York, have invented, made, and applied to use a new and useful Apparatus for Soldering Tin Cans and articles of like character; and that the following is a full, clear, and correct description thereof, reference being had to the accompanying drawing, making part of this specification, and to the letters of reference marked thereon, in which—

Figure 1:
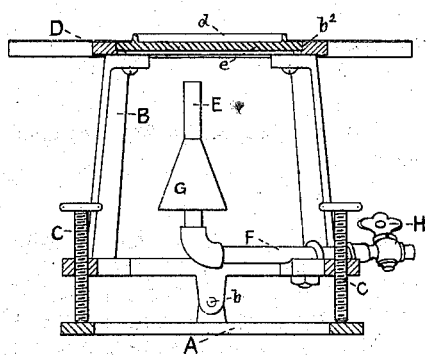
Figure 2:
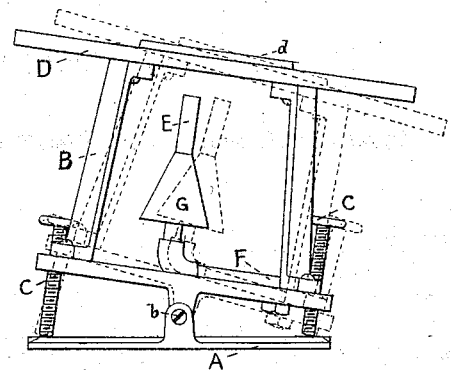
Figure 3:
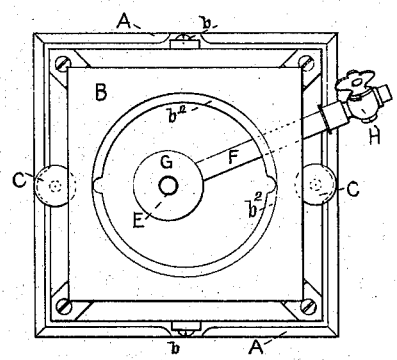
Figure 4:
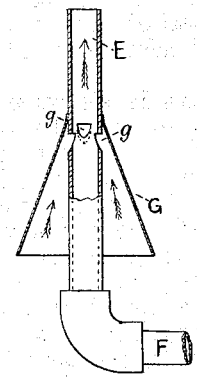
Figure 5:
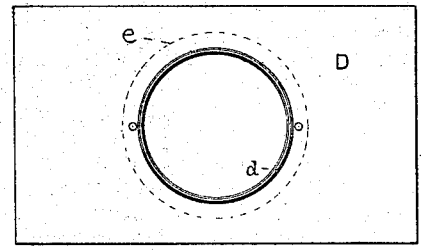
Figure 6:
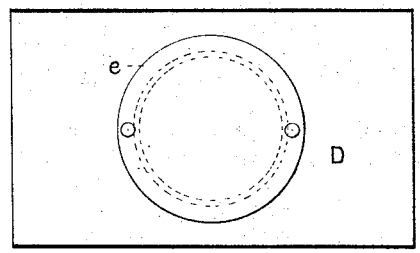

Figure 1 is a side elevation of our soldering apparatus, showing the table in the horizontal position. Fig. 2 is a sectional view of the same, showing the table in the inclined position. Fig. 3 is a top view of the same, the table having been removed. Fig. 4 is a sectional view of the burner used. Fig. 5 is a view of the upper side of the table. Fig. 6 is a view of the under side of the table.

In the drawing, like parts of the invention are designated by the same letters of reference.

The nature of the present invention consists in the construction, as more fully hereinafter set forth, of an improved machine for use in soldering tin cans and like articles; the object of the invention being the construction of a machine for such purpose, by which the operation of soldering tin cans and like articles can be expeditiously and cheaply done.

To enable those skilled in the arts to make and use our invention, we will describe the same.

A shows the base of the machine for supporting the frame B. B shows the frame for supporting the table D of the machine. This frame B is swiveled to the base A about centrally, as at $b$, and is provided with the regulating-screws C passed through it, and having a bearing upon the base A. The upper portion of the frame is hollowed, as at $b^2$, to receive the table D, as hereinafter set forth. D shows the table of the machine, formed of an oblong plate of metal, the sides of which are turned down at a right angle to the face thereof, and provided upon its under side with a projecting disk, $e$, which, when the table is placed in position upon the frame, is received within the hollowed portion $b^2$ of the frame B. The upper or top portion of the table D is provided in the present instance with a circular flange, $d$, to receive the can to be soldered within it. E is the burner for supporting heat to the table D. This burner is attached to the pipe F, and is placed directly beneath the opening in the frame B, so that when the table D is placed in position, the same shall be heated by the flame from the burner E. The burner is provided with a cone, G, placed over it, and provided with a series of openings, $g$, so that air is conducted upward by the cone, and supplied to the flame of the burner at its base through the openings in the upper portion of the cone. The pipe F is provided with a cock, H, and may be connected to a gas-burner by a flexible tube, or in any convenient way.

Such being the construction, the operation is as follows:

As stated, the pipe F may be connected by a flexible tube to a gas-burner, and gas will be supplied to the burner by opening the cock H in the pipe F. The table D is placed upon the frame B, the projecting disk $e$ upon the under side of the same being received within the hollowed portion $b^2$ of the frame B. The table D may be placed in the horizontal position shown in Fig. 1 of the drawing, or may be placed at any desired angle by turning and elevating one of the screws C, and turning and depressing the opposite screw C. Some classes of work can be more rapidly done when the table D is inclined. The can or other article to be soldered is received within the flange $d$ of the table D, and, the gas having been supplied to the burner, the table is heated sufficiently to melt the solder placed in the can after the bottom has been inserted in the same, and the can has been placed in position upon the table. The can may be turned by hand upon the table by the workman during the operation of soldering. The addition of the cone G to the burner, conducting a current of air to the base of the flame, renders the flame more powerful, prevents smoking of the under side of the table, and expedites the work of soldering.

We have shown the table provided with a circular flange, because most frequently such a flange would be required, although we are aware that any shaped flange may be used.

The machine may be made of any suitable metal, can be afforded at a low cost, and will be found to efficiently accomplish the purpose for which it is intended.

Having now set forth our invention, what we claim as new is—

The combination of the base A, movable frame B, regulating-screws C, table D, and pipe F, provided with a burner, E, constructed and operating substantially as and for the purpose set forth.

EDWARD HINE.
    GEORGE W. BENTLEY.

In presence of—
 HENRY BISCHOFF,
 CHS. F. HINE.